US008255960B2

(12) United States Patent
Yu

(10) Patent No.: US 8,255,960 B2
(45) Date of Patent: Aug. 28, 2012

(54) METHOD AND SYSTEM FOR PROVIDING VOD SERVICES IN A DIGITAL CABLE TV NETWORK

(75) Inventor: In-chul Yu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 726 days.

(21) Appl. No.: 11/175,298

(22) Filed: Jul. 7, 2005

(65) Prior Publication Data

US 2006/0010477 A1 Jan. 12, 2006

(30) Foreign Application Priority Data

Jul. 8, 2004 (KR) .................. 10-2004-0053084

(51) Int. Cl.
*H04N 7/173* (2011.01)
(52) U.S. Cl. ........................... 725/86; 725/87
(58) Field of Classification Search .............. 725/87
See application file for complete search history.

(56) References Cited

U.S. PATENT DOCUMENTS

| | | | |
|---|---|---|---|
| 6,618,858 B1 * | 9/2003 | Gautier ................ | 725/132 |
| 6,901,453 B1 * | 5/2005 | Pritchett et al. ........ | 709/250 |
| 7,124,424 B2 * | 10/2006 | Gordon et al. .......... | 725/43 |
| 7,200,857 B1 * | 4/2007 | Rodriguez et al. ....... | 725/87 |
| 2002/0165983 A1 * | 11/2002 | Gastaldi ................ | 709/245 |
| 2003/0046686 A1 * | 3/2003 | Candelore et al. ....... | 725/31 |
| 2005/0097600 A1 * | 5/2005 | Heer .................... | 725/37 |
| 2005/0125841 A1 * | 6/2005 | Helms et al. ........... | 725/118 |
| 2005/0155069 A1 * | 7/2005 | LaJoie et al. .......... | 725/80 |
| 2005/0235319 A1 * | 10/2005 | Carpenter et al. ....... | 725/52 |
| 2008/0046572 A1 * | 2/2008 | Jagels ................. | 709/227 |

FOREIGN PATENT DOCUMENTS

| | | |
|---|---|---|
| JP | 64-89687 | 4/1989 |
| KR | 96-706749 | 12/1996 |
| KR | 10-1998-0020631 | 6/1998 |
| KR | 2002-0090727 | 12/2002 |

* cited by examiner

*Primary Examiner* — Brian Pendleton
*Assistant Examiner* — Jean D Saint Cyr
(74) *Attorney, Agent, or Firm* — Staas & Halsey LLP

(57) ABSTRACT

A method and system for providing video-on-demand services are provided. The method of providing video-on-demand (VOD) services comprises transmitting service information to a set-top box via an out-of-band channel, receiving location and identification information of the set top box via the out-of-band channel, receiving a VOD service request from the set-top box via the out-of-band channel, and providing the set-top box with the requested content via an in-band channel with reference to the location and identification information of the set-top box.

16 Claims, 5 Drawing Sheets

METHOD AND SYSTEM FOR PROVIDING VOD SERVICES IN A DIGITAL CABLE TV NETWORK

CROSS-REFERENCE TO RELATED APPLICATION

This application claims benefit from Korean Patent Application No. 10-2004-0053084 filed on Jul. 8, 2004 in the Korean Intellectual Property Office, the disclosure of which is incorporated herein by reference in its entirety.

BACKGROUND OF THE INVENTION

1. Field of the Invention

The present invention relates to video-on-demand (VOD) services, and more particularly, to a method and system for providing VOD services in a digital cable TV network.

2. Description of the Related Art

Video-on-demand (VOD) services provide video data, such as a movie or news, via a network at the request of a subscriber. In general, a VOD service is realized by compressing a video program using a digital data compression method such as MPEG-2, storing the compressed video program in a VOD server, and providing the stored video program to a subscriber via an Internet protocol (IP) network or a digital cable TV network when the subscriber requests the corresponding video program.

Korean Laid-Open Patent Gazette No. 2002-0090727 discloses a set-top box network system that can download a broadcast program and provide a VOD service using an IP network. However, broadband networks do not have sufficient bandwidth to provide high-quality VOD services even though they were commercialized for a long time. Therefore, the quality of many Internet VOD services is generally lower than the quality of TV broadcast programs.

Korean Laid-Open Patent Gazette No. 1996-0706749 (International Patent Application No. WO 1995/015658) discloses a network manager for a cable TV system head end that is useful for processing upstream subscriber communications and can provide various services, such as near VOD services, virtual VOD services, and interactive program services. However, there is still uncertainty regarding how the network manager is able to search for a subscriber in a cable TV network, recognize a set-top box of the subscriber, and provide a tailor-made VOD service to the subscriber. In other words, the network manager can provide VOD services to a subscriber if a VOD server is connected to the subscriber's set-top box. However, since received VOD channels may differ depending on the service network, the network manager may not be able to determine to which set-top box in which cell it should transmit a program.

Recently, digital cable TV networks provide out-of-band channels, which can be used for data transmissions, as well as in-band channels, via which broadcast programs are provided. These out-of-band channels have made interactive TV broadcasting and unidirectional TV broadcasting possible, a conventional way of broadcasting in which broadcast programs are transmitted only in one direction. In addition, subscribers can enjoy point-to-point communications using their set-top boxes. Accordingly, VOD services can be easily implemented on a digital cable TV network. Unlike in-band channels, however, out-of-band channels do not have the necessary bandwidth to provide high-quality VOD services.

Therefore, in order to satisfy the demands of both subscribers and content providers, it is necessary to develop a system and method for TV network that enables point-to-point communication and has sufficient bandwidth to provide high quality VOD services in a digital cable network.

SUMMARY OF THE INVENTION

Additional aspects and/or advantages of the invention will be set forth in part in the description which follows and, in part, will be apparent from the description, or may be learned by practice of the invention.

An aspect of the present invention provides a method and system for providing video-on-demand (VOD) services using in-band channels.

An aspect of the present invention also provides a method of using VOD services using in-band channels.

According to an aspect of the present invention, there is provided a method of providing video-on-demand (VOD) services comprising: transmitting service information to a set-top box via an out-of-band channel, receiving location and identification information of the set top box via the out-of-band channel, receiving a VOD service request from the set-top box via the out-of-band channel, and providing the set-top box with the requested content via an in-band channel with reference to the location and identification information of the set-top box.

According to another aspect of the present invention, there is provided a method of using VOD services including: enabling a set-top box to receive service information via an out-of-band channel, obtaining location information from the service information and transmitting the obtained location and identification information of the set-top box to a VOD service system via the out-of-band channel, enabling the set-top box to issue a VOD service request to the VOD service system via the out-of-band channel, and enabling the set-top box to receive content via an in-band channel.

According to still another aspect of the present invention, there is provided a VOD service system including: a VOD server that provides the selected content in response to a VOD service request, a subscriber manager that manages subscriber information, and a transmission unit that transmits the selected content to a subscriber. The transmission unit transmits service information to the set-top box via an out-of-band channel. The subscriber manager stores location and identification information of the set-top box received via the out-of-band channel, the VOD server receives a VOD service request issued by the set-top box and provides the requested content to the set-top box. Finally, the transmission unit provides the requested content to the set-top box via an in-band channel with reference to the location and identification information of the set-top box.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
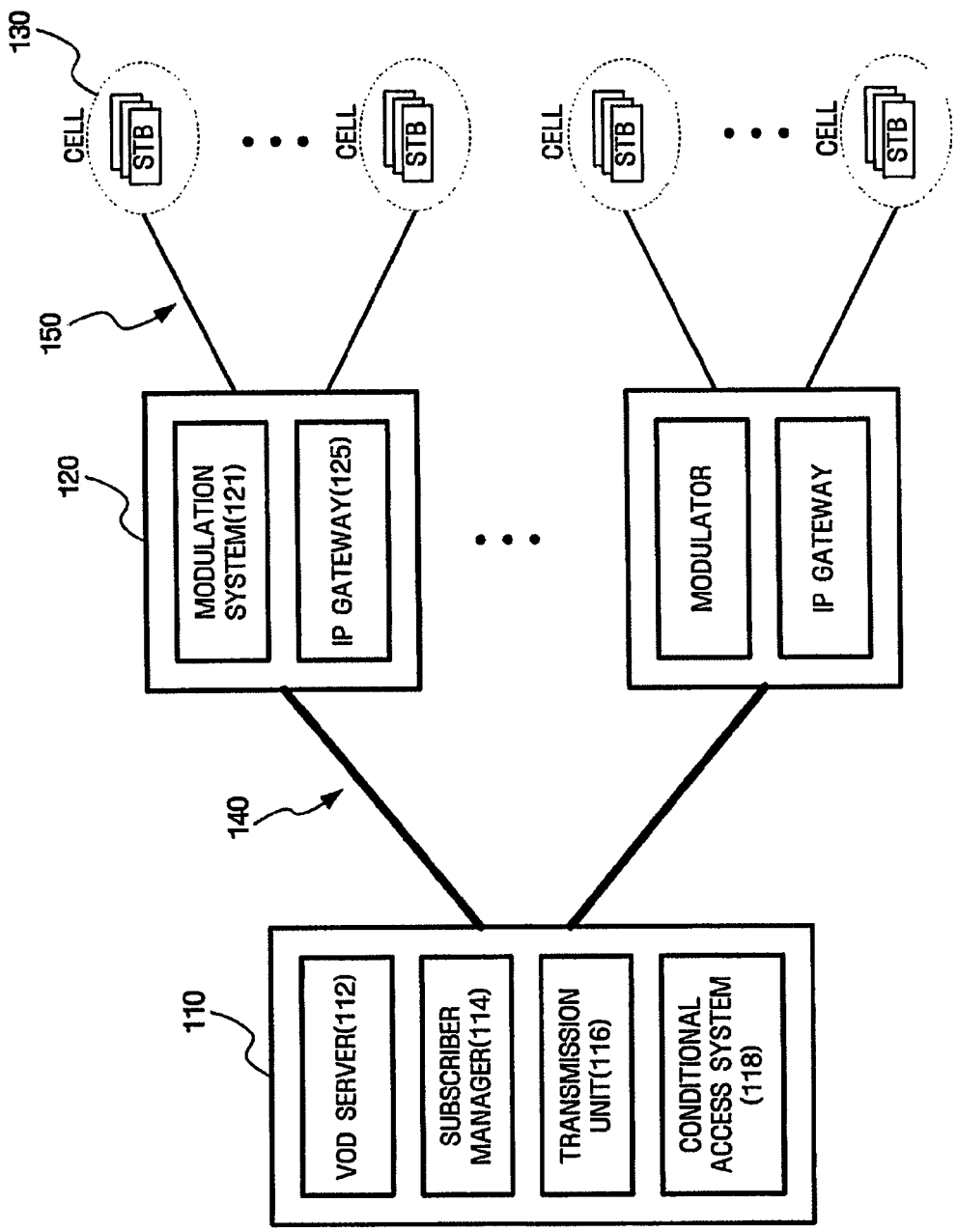
FIG. 1 is a block diagram of a system for providing video-on-demand (VOD) services according to an exemplary embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of the invention are shown.

FIG. 1 is a block diagram of a system to provide video-on-demand (VOD) services according to an exemplary embodiment of the present invention.

Referring to FIG. 1, the system includes a VOD service system 110, at least one distribution system 120, and a plurality of cells 130.

The VOD service system 110 includes a VOD server 112, a subscriber manager 114, a transmission unit 116, and a conditional access system 118.

The VOD server 112 receives a request for a VOD service from a subscriber and provides the content selected by the subscriber. To do this, the VOD server 112 stores various content therein or in a separate content database (not shown). The content stored in the VOD sever 112 or in the content database is compressed and it is provided to the subscriber without being decompressed. For example, the contents may be compressed by an MPEG-2 method and then provided to a subscriber's set-top box in the same manner as in digital TV broadcasting. Contents transmitted to a subscriber may be compressed by an MPEG-4, an MPEG-7, an MPEG-21, an H.263, or an H.264.

The subscriber manager 114 manages subscriber information. The subscriber manager 114 stores location and identification information of a set-top box, transmitted by the set-top box to the system over an out-of-band channel. The subscriber manager 114 authenticates the subscriber that has issued the request for a VOD service manages information on VOD services consumed by the subscriber and costs for these services. In addition, the subscriber manager 114 determines which genre or type of content the subscriber prefers and it provides a list of this content to the subscriber in advance. Moreover, the subscriber manager 114 may determine whether to provide the content selected by the subscriber by considering the personal information of the subscriber. For example, if the subscriber is a minor, the subscriber manager 114 may reject the subscriber's request for sexually-oriented or violent content.

The transmission unit 116 transmits content provided by the VOD server 112 to the distribution system 120, which provides cable TV broadcast services, so that the content can be provided to the subscriber as a cable TV broadcast service. The transmission unit 116 may transmit the content provided by the VOD server 112 to the subscriber over an in-band channel using the location and identification information of the subscriber. In addition, the transmission unit 116 may transmit service information including a network interface table (NIT) and a virtual channel table (VCT) to the subscriber over an out-of-band channel. Then, a subscriber's set-top box can obtain VOD transport data from the NIT and the VCT.

The transmission unit 116 may transmit the content provided by the VOD server 112 to the distribution system 120 via an optical cable 140.

The conditional access system 118 prevents an unauthorized user from using the content provided by the VOD server 112. In other words, the conditional access system 118 provides protection for the content provided by the VOD server 112. The conditional access system 118 scrambles the content provided by the VOD server 112, and the transmission unit 116 transmits the scrambled content to the subscriber. When the subscriber is successfully authenticated, the scrambled content is descrambled so that the subscriber can watch it.

The distribution system 120 receives content from various content providers, modulates the received content into signals whose frequencies are compatible with various ports using a modulation system 121, and combines the signals together. The combination results are transmitted to each of the cells 130 over an in-band channel. The cell 130 is a unit in which the combination of the contents provided by cable TV broadcast is identical. At least one set-top box is connected to each of the cells 130. The distribution system 120 may transmit the content provided by the VOD server 112 to each of the cells 130 via a hybrid fiber coaxial (HFC) network 150.

An HFC network is a broadband network of optical and coaxial cables. An HFC network can provide a considerable amount of TV content or interactive communication data as well as other control signals by connecting a broadcasting station and an optical network unit (ONU) using coaxial cables. The HFC network can support a wide bandwidth by achieving a theoretical transmission speed of 9,600 bps-30 Mbps for each channel with a bandwidth of 6 MHz. An HFC network is also a 2-way interactive system that can transmit downstream signals from an ONU to a subscriber and receive upstream signals from a subscriber to an ONU. In addition, an HFC network can transmit data such as Internet service using channels which are not used for broadcasting content to subscribers, i.e., out-of-band channels having a 6 MHz bandwidth. The distribution system 120 includes an IP gateway 125, which enables the subscriber to use Internet services via out-of-band channels. The IP gateway 125 enables point-to-point communication between a plurality of set-top boxes each having an IP.

Figure 2:
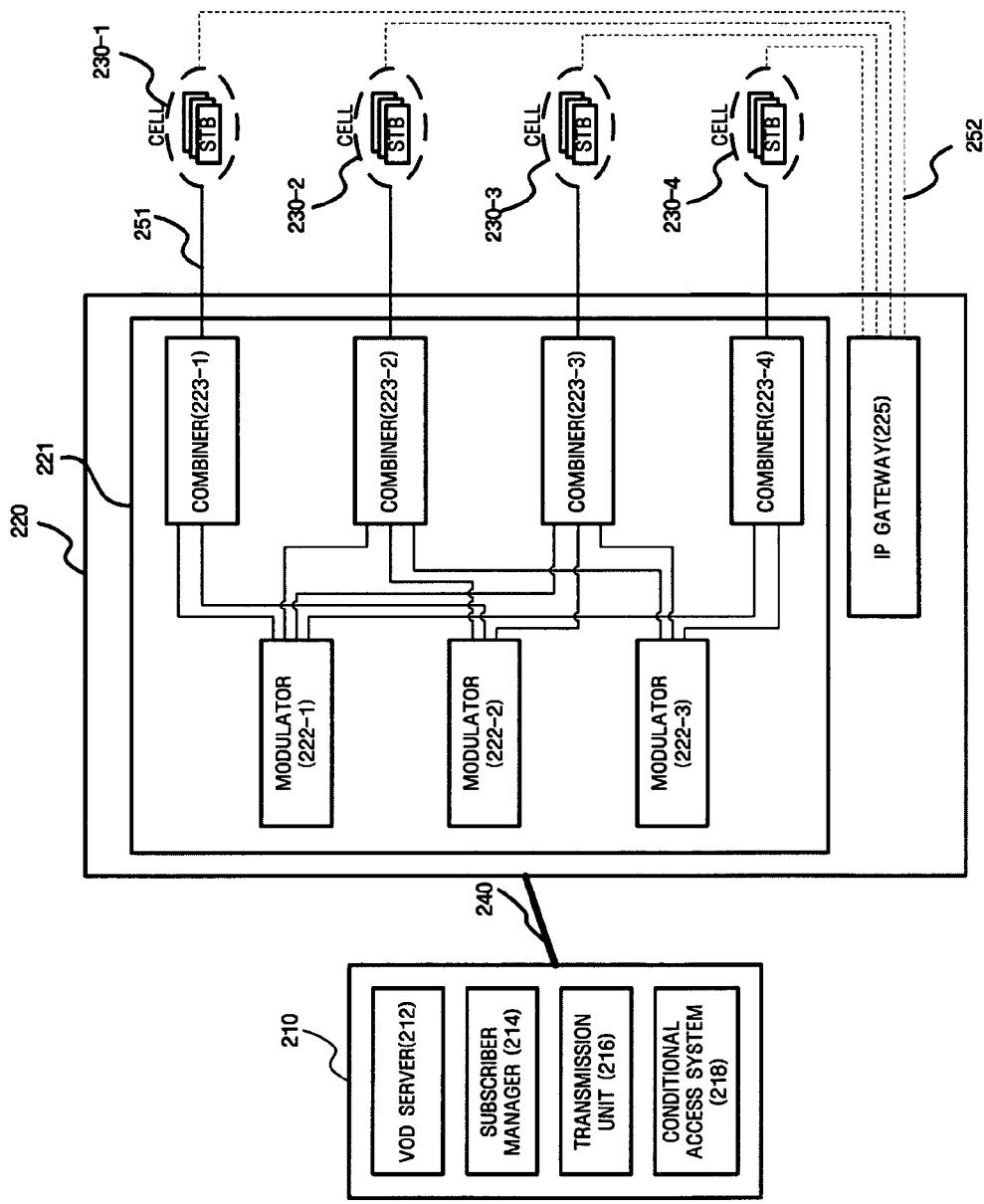
FIG. 2 is a detailed block diagram of the system of FIG. 1.

FIG. 2 is a detailed block diagram illustrating an example of the VOD service system 110 of FIG. 1, i.e., a VOD service system 210, and a distribution system 220.

Referring to FIG. 2, the VOD service system 210 includes a VOD server 212, a subscriber manager 214, a transmission unit 216, and a conditional access system 218. The VOD server 212, the subscriber manager 214, the transmission unit 216, and the conditional access system 218 are the same as their respective counterparts in FIG. 1, and thus their detailed descriptions will be omitted.

The distribution system 220 receives content from various content providers and modulates the received content into signals whose frequencies are compatible with various ports using a modulation system 221. The modulation system 221 includes a plurality of modulators 222-1, 222-2, and 222-3, and a plurality of combiners 223-1, 223-2, 223-3, and 223-4.

The modulators 222-1, 222-2, and 222-3 modulate content requested by the VOD service system 210 into signals whose frequencies are compatible with various ports. The modulation results are combined by the combiners 223-1, 223-2, 223-3, and 223-4. For example, signals modulated by the modulators 222-1 and 222-2 may be combined by the combiner 223-1, and signals modulated by the modulators 222-1, 222-2, and 222-3 may be combined by the combiner 223-2, and signals modulated by the modulators 222-1 and 222-3 may be combined by the combiner 223-3. The combination results are transmitted to each of a plurality of cells 230-1, 230-2, 230-3, and 230-4. For example, signals combined by the combiner 223-1 may be transmitted to the cell 230-1, signals combined by the combiner 223-2 may be transmitted to the cell 230-2, signals combined by the combiner 223-3 may be transmitted to the cell 230-3, and signals combined by the combiner 223-4 may be transmitted to the cell 230-4. At least one set-top box is connected to each of the cells 230-1, 230-2, 230-3, and 230-4. In general, a cell consists of hundreds of set-top boxes.

A method of providing VOD services according to an embodiment of the present invention will now be described with reference to FIG. 3. A VOD service may be provided by a hardware device or it may be provided as a hardware device with a computing unit and a software program that can be used for operating the hardware device. In addition, a software program that can realize a VOD service may be written on a magnetic or optical recording medium and then combined with a hardware device having a computing unit.

Figure 3:
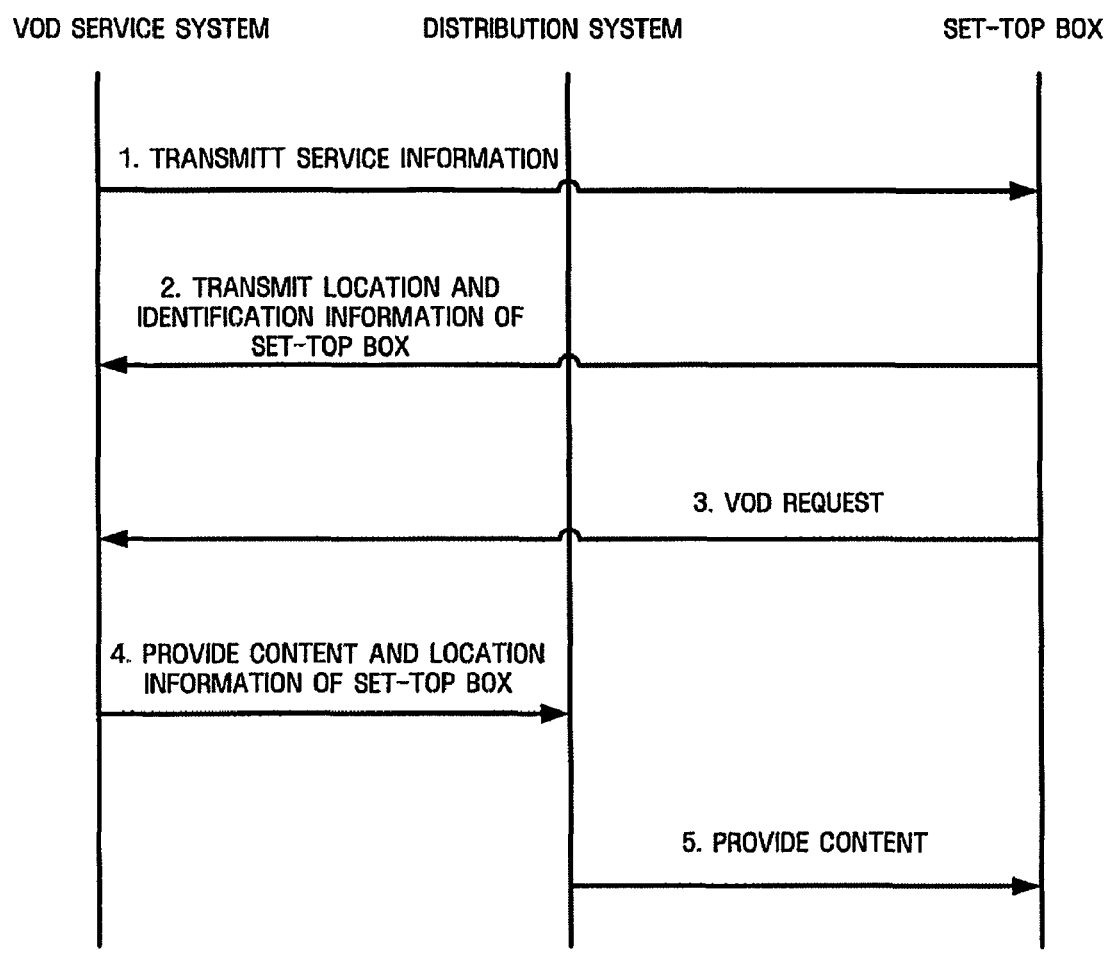
FIG. 3 is a diagram illustrating a method of providing VOD services according to an exemplary embodiment of the present invention.

FIG. 3 is a diagram illustrating a method of providing VOD services according to an exemplary embodiment of the present invention.

Referring to FIG. 3, a VOD service system transmits service information to a set-top box. The service information may include a NIT and a VCT, in which case, the set-top box can obtain VOD transport data from the NIT and VCT.

Thereafter, the set-top box transmits its location and identification information to the VOD service system. The location information of the set-top box can be a transport identifier (TSID) obtained from a program association table (PAT), and the identification information of the set-top box can be a media access control (MAC) address.

Next, the set-top box issues a request for a VOD service to the VOD service system.

Then, the VOD service system provides the location and identification information together with the requested content to a distribution system.

Finally, the distribution system transmits the requested content to a cell where the set-top box is located (with reference to the location information and identification information of the set-top box).

The operations of the set-top box and the VOD service system will now be described in detail with reference to FIGS. 4 and 5.

Figure 4:
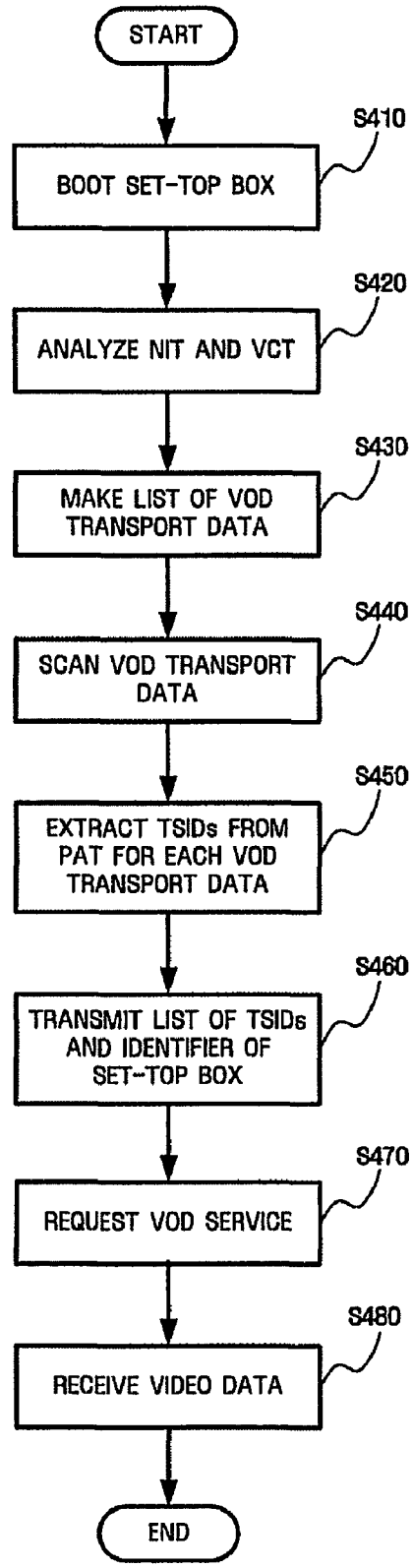
FIG. 4 is a flowchart illustrating the operation of a set-top box according to an exemplary embodiment of the present invention.

Referring to FIG. 4, in operation S410, the set-top box is turned on and then booted. When booted, the set-top box is able to receive signals via a cable TV network.

In operation S420, the set-top box receives system information transmitted over an out-of-band channel and then analyzes the NIT and VCT information contained therein. A hidden flag (or a hide-guide flag) is set in VOD transport data so that the VOD transport data can be differentiated from regular transport data containing cable broadcast content.

In operation S430, the set-top box makes a list of all VOD transport data. In operation S440, the set-top box scans each of the VOD transport data in an in-band channel looking for a PAT (from the existing transport).

In operation S450, the set-top box extracts a TSID from each group of VOD transport data by analyzing the PAT. In operation S460, the set-top box transmits its identifier and a list of TSIDs to the VOD service system. A TSID of the set-top box can be used as the location information of the set-top box.

In operation S470, a subscriber issues a VOD request to the VOD service system using the set-top box. In other words, the subscriber selects content that a user wants to receive and requests the selected content. In operation S480, the set-top box receives video data from the VOD service system. If the received video data is compressed in such a digital data compression method such as MPEG-2, it is decompressed using MPEG-2.

Figure 5:
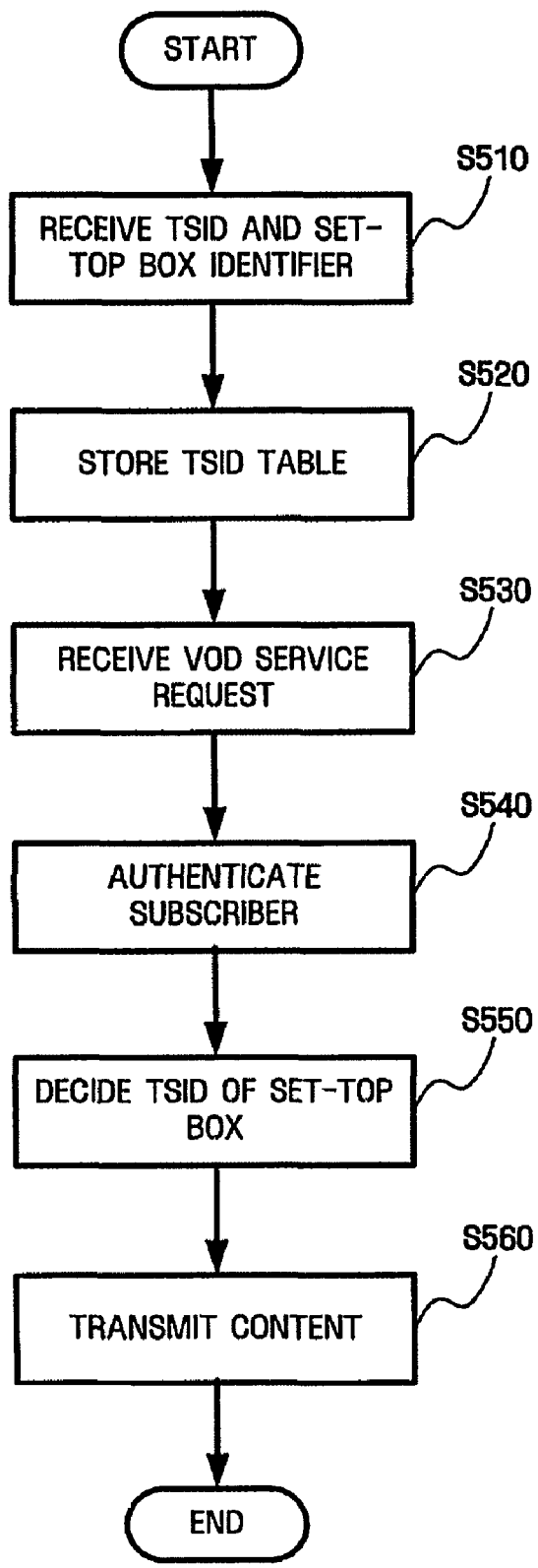
FIG. 5 is a flowchart illustrating the operation of a VOD service system according to an exemplary embodiment of the present invention.

Referring to FIG. 5, in operation S510, the VOD service system receives a TSID list and a set-top box identifier from the set-top box.

A TSID of a set-top box can be used as location information for the set-top box.

In operation S520, the received TSID list is stored in a TSID table. The TSID table stores lists of TSIDs that can be used by various subscribers and it is managed by a subscriber manager.

In operation S530, the VOD service system receives a VOD request issued by the subscriber.

In operation S540, the VOD service system authenticates the subscriber based on an identifier of the set-top box. For example, the MAC address of the set-top box can be used for authentication. Alternatively, the VOD service system may authenticate the subscriber based on a name and/or a password input by the subscriber. If the subscriber is successfully authenticated, the VOD service system allows the subscriber to use a VOD service.

In operation S550, if the subscriber is successfully authenticated, the VOD service system acquires the TSID of the authenticated set-top box. In operation S560, the VOD service system provides the content requested by the subscriber to a modulator of the distribution system corresponding to the determined TSID. Different transport data have different TSIDs, and transport data can be selected by the VOD service system by looking at TSID. Thereafter, the distribution system provides the requested content to a cell where the set-top box of the subscriber is located so that the requested content can be delivered.

To conclude the detailed description, those skilled in the art will appreciate that many variations and modifications can be made to the embodiments without substantially departing from the principles of the present invention. Therefore, the disclosed embodiments of the invention are used in a general and descriptive sense only and not for purposes of limitation.

According to an aspect of the present invention, it is possible to provide VOD services by using in-band channels in a cable network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of providing video-on-demand (VOD) services comprising:
    transmitting service information from a VOD service system to a set-top box via an out-of-band channel;

transmitting location and identification information from the set top box to the VOD service system via the out-of-band channel after the transmitting of service information;

transmitting a VOD service request from the set-top box to the VOD service system via the out-of-band channel after transmitting location and identification information of the set top box; and providing the requested content from the VOD service system to a distribution system via an in-band channel with reference to the location and identification information of the set-top box, and providing the requested content from the distribution system to the set-top box via the in-band channel, wherein the location information of the set-top box is a transport identifier (TSID), the location information, is stored in a TSID table, and the transmitting location and identification information is generated by extracting VOD transport data by analyzing a network interface table (NIT) and a virtual channel table (VCT) contained in the service information; scanning the VOD transport data to obtain a program association table (PAT); and extracting TSIDs from the PAT.

2. The method of claim 1, further comprising:

storing the location and identification information of the set-top box.

3. The method of claim 1, wherein the step of providing the set-top box with the requested content comprises:

authenticating the set-top box;

verifying the location and identification information of the set-top box; and providing the requested content to the set-top box.

4. The method of claim 1, wherein the content is scrambled content.

5. The method of claim 1, wherein the identification information of the set-top box is a media access control (MAC).

6. The method of claim 3, wherein the authenticating is to use a media access control(MAC).

7. The method of claim 3, wherein the authenticating using a user name and a password.

8. A method of using VOD services comprising:

enabling a set-top box to receive service information via an out-of-band channel;

obtaining location information from the service information and transmitting by the set-top box the obtained location information and identification information of the set-top box to a VOD service system via the out-of-band channel after the set-top box receives service information;

enabling the set-top box to issue a VOD service request to the VOD service system via the out-of-band channel after transmitting location and identification information of the set top box; and enabling the set-top box to receive content via an in-band channel, comprising transmitting the content and the location and identification information from the VOD service system to a distribution system, and transmitting the content from the distribution system to the set-top box, wherein the location information is a transport identifier (TSID), and transmitting the obtained location and identification information of the set-top box comprises extracting VOD transport data by analyzing a network interface table(NIT) and a virtual channel table(VCT) contained in the service information;

scanning the VOD transport data to obtain a program association table (PAT);

extracting TSIDs from the PAT; and transmitting a list of the extracted TSIDs to the VOD service system.

9. The method of claim 8, wherein the identification information of the set-top box is a media access control (MAC).

10. The method of claim 8, wherein the received content is scrambled content.

11. A VOD service system comprising:

a VOD server, which provides selected content in response to a VOD service request;

a subscriber manager that manages subscriber-related information; and a transmission unit that transmits the selected content to a subscriber;

wherein the transmission unit transmits service information from the VOD server to a set-top box via an out-of-band channel the set top box transmits its location and identification information to the VOD system service, the subscriber manager stores location and identification information transmitted by the set-top box and received via the out-of-band channel after the transmission of service information, the VOD server receives a VOD service request issued by the set-top box and provides the requested content to the set-top box after receiving location and identification information of the set top box, the transmission unit provides the requested content to a distribution system via an in-band channel with reference to the location and identification information of the set-top box, and the distribution system provides the requested content to the set-top box via the in-band channel, the location information is a transport identifier(TSID), the location information is stored in a TSID table, and the transmitted location and identification information is generated by extracting VOD transport data by analyzing a network interface table (NIT) and a virtual channel table (VCT) contained in the service information; scanning the VOD transport data to obtain a program association table (PAT); and extracting TSIDs from the PAT.

12. The method of claim 11, wherein the identification information of the set-top box is a media access control (MAC).

13. The VOD service system of claim 11, wherein the subscriber manager further executes a function of authenticating the set-top box.

14. The VOD service system of claim 11, further comprising a conditional access system protects content by a predetermined method.

15. A non-transitory recording medium having a computer readable program recorded therein, the program for executing a method of providing video-on-demand (VOD) services, the method comprising:

transmitting service information from a VOD service system to a set-top box via an out-of-band channel;

receiving location and identification information transmitted by the set top box via the out-of-band channel after the transmitting of service information;

receiving a VOD service request from the set-top box via the out-of-band channel after receiving location and identification information of the set top box;

providing a distribution system with the requested content via an in-band channel with reference to the location and identification information of the set-top box; and providing the set-top box with the content from the distribution system via the in-band channel, wherein the location information of the set-top box is a transport identifier (TSID), the location information is stored in a TSID table, and the transmitting location and identification information is generated by extracting VOD transport data by analyzing a network interface table (NIT) and a virtual channel table (VCT) contained in the service information; scanning the VOD transport data to obtain a program association table (PAT); and extracting TSIDs from the PAT.

16. A non-transitory recording medium having a computer readable program recorded therein, the program for executing a method of using VOD services comprising:

enabling a set-top box to receive service information from a VOD service system via an out-of-band channel;

obtaining location information from the service information;

transmitting, by the set-top box, the obtained location information and identification information of the set-top box to the VOD service system via the out-of-band channel;

enabling the set-top box to issue a VOD service request to the VOD service system via the out-of-band channel after transmitting location and identification information of the set top box;

enabling a distribution system to receive content and the location and identification information via an in-band channel; and enabling the set-top box to receive the content from the distribution system via the in-band channel, wherein the location information is a transport identifier (TSID), and transmitting the obtained location and identification information of the set-top box comprises extracting VOD transport data by analyzing a network interface table(NIT) and a virtual channel table(VCT) contained in the service information;

scanning the VOD transport data to obtain a program association table (PAT);

extracting TSIDs from the PAT; and transmitting a list of the extracted TSIDs to the VOD service system.

\* \* \* \* \*